United States Patent [19]

Karle et al.

[11] Patent Number: 5,116,685

[45] Date of Patent: May 26, 1992

[54] MAGNETIC RECORDING MEDIUM COMPRISING A POLYESTER POLYURETHANE POLYMER AND A SMALL PERCENTAGE OF A LOW MOLECULAR WEIGHT POLYOL

[75] Inventors: Dennis W. Karle, San Jose; Fred C. Chung, Palo Alto; Frederic J. Sischka, II, Los Gatos, all of Calif.

[73] Assignee: Memorex Telex, N.V., Amsterdam, Netherlands

[21] Appl. No.: 480,179

[22] Filed: Feb. 14, 1990

[51] Int. Cl.⁵ .............................................. G11B 23/00
[52] U.S. Cl. ...................... 428/425.9; 428/694; 428/900; 252/62.54
[58] Field of Search .............. 428/694, 900, 425.9; 427/128; 252/62.54, 62.55, 62.56

[56] References Cited

U.S. PATENT DOCUMENTS

| | | | |
|---|---|---|---|
| 3,574,684 | 4/1971 | Higashi | 117/237 |
| 4,020,227 | 4/1976 | Deffeyes | 428/306 |
| 4,284,750 | 8/1981 | Amirsakis | 528/79 |
| 4,537,833 | 8/1985 | Kasuga et al. | 428/328 |
| 4,539,260 | 9/1985 | Abe et al. | 428/336 |
| 4,544,601 | 10/1985 | Yamaguchi et al. | 428/330 |
| 4,548,855 | 10/1985 | Ono et al. | 428/147 |
| 4,559,118 | 12/1985 | Heil et al. | 204/159.14 |
| 4,560,456 | 12/1985 | Heil et al. | 204/159.14 |
| 4,613,545 | 9/1986 | Chubachi et al. | 428/328 |
| 4,650,720 | 3/1987 | Yamaguchi et al. | 428/480 |
| 4,659,627 | 4/1987 | Chung et al. | 428/447 |
| 4,686,146 | 8/1987 | Karle et al. | 428/425.9 |
| 4,713,288 | 12/1987 | Kokaku et al. | 428/336 |
| 4,728,577 | 3/1988 | Yamada et al. | 428/423.7 |
| 4,795,672 | 1/1989 | Takeda et al. | 428/216 |
| 4,820,581 | 4/1989 | Saito et al. | 428/323 |
| 4,822,637 | 4/1989 | Chung et al. | 427/128 |
| 4,840,830 | 6/1989 | Sakamoto et al. | 428/141 |

OTHER PUBLICATIONS

*Encyclopedia of Chemical Technology*, vol. 14, John Wiley & Sons, Inc., 1981, pp. 732-753.

*Primary Examiner*—Paul J. Thibodeau
*Assistant Examiner*—Stevan A. Resan
*Attorney, Agent, or Firm*—Townsend & Townsend

[57] ABSTRACT

Compositions for magnetic recording media comprising a nonmagnetic support and a magnetic layer adhered to the nonmagnetic support, wherein the magnetic layer comprises a ferromagnetic substance and a binder system, preferably the binder system comprises primarily a polyester polyurethane polymer and small percentage amounts of a low molecular weight polyol crosslinked with a multifunctional isocyanate. Methods of formation of the compositions are also described. Presence of the low molecular weight polyol is particularly important in attaining desired performance characteristics in wound pile stability, layer-to-layer adhesion, and durability.

9 Claims, No Drawings

MAGNETIC RECORDING MEDIUM COMPRISING A POLYESTER POLYURETHANE POLYMER AND A SMALL PERCENTAGE OF A LOW MOLECULAR WEIGHT POLYOL

BACKGROUND OF THE INVENTION

The present invention relates generally to methods and compositions useful for binding magnetic materials to nonmagnetic surfaces. The products so formed are useful as magnetic recording media.

Magnetic recording media presently are used in a variety of forms, e.g., audiotape, videotape, flexible disks, hard disks, etc. Such recording media are comprised essentially of a magnetic recording layer provided on a nonmagnetic support. The magnetic recording layer is comprised of a ferromagnetic powder dispersed in a binder system. Usually, the ferromagnetic powder is a metal oxide having ferromagnetic properties. However, ferromagnetic metals and alloys may also be employed. (See, for example, U.S. Pat. No. 4,820,581) Additional components, such as lubricants, abrasives, and conductants may also be present in the medium.

The binder composition used to attach the ferromagnetic powder to the support is particularly problematic due to the several physical properties that must be optimized to produce a commercially feasible product. For example, the magnetic layer must be tough enough to withstand impacts but flexible enough to permit coiling, when the medium is tape, without breaking or cracking the recording medium. Also, the recording medium must exhibit good layer-to-layer adhesion to prevent peeling and spalling of the recording layer from the support. Additionally, the binder composition must afford good durability and stability to environmental factors, such as resistance to oxidation when the ferromagnetic material is a metal or alloy.

Previous methods for making magnetic recording media typically employ a binder system comprised of various amounts of polymer blends and additives. Additives such as multifunctional isocyanates and lubricants are exemplary. Polyblends or resins such as high molecular weight hydroxyl-containing resins are exemplary compounds for magnetic binders. See, for example, *Chemical Encyclopedia*, 14:732 (1985). The additives or resins are added to the magnetic layer composition in order to impart physical toughness to the layer, to improve the oxidative, thermal and hydrolytic stability of the layer, to enhance the dispersion of ferromagnetic particles, etc.

A common method for increasing the physical toughness of a magnetic coating is to perform crosslinking reactions of multifunctional components in the mixture. One type of crosslinking reaction employed in this regard is the stepwise reaction of high molecular weight hydroxyl functional species with multifunctional isocyanates. Usually the hydroxyl functional species is a long-chain polymeric species having a high molecular weight, e.g., greater than 20,000 D. However, it is generally found that high molecular weight hydroxyl-containing species afford inferior recording media because of the impact on dispersion quality, layer-to-layer adhesion, wound pile stability, and because of the large amounts required to achieve a high cross-link density.

Few examples of magnetic recording compositions utilizing metal oxides and low molecular weight polyols in the magnetic coating layer have appeared. U.S. Pat. No. 4,020,227 describes a magnetic coating composition comprising iron oxide and a binder comprising a polyether polyurethane resin, a glycol of molecular weight greater than 2000 D, and a polyisocyanate.

The amount of hydroxyl-containing species employed in the above formulations typically corresponds to as much as 15-50% of the binder system and 3-10% of the final coating. Also, present methods of incorporation of ingredients often prevent obtaining desired dispersion characteristics due to the large amount of additives used after dispersion has been achieved. Thus, methods and compositions that reduce the amount of post-milling additives are needed. Such improvements would improve the overall quality, reduce the cost of materials for magnetic coatings and improve the mutual compatibility of the magnetic layer components.

Additionally, present magnetic recording media exhibit less than ideal performance with respect to such critical properties as durability, layer-to-layer adhesion, and environmental tape pack stability. It is likely that improvements in these properties can be obtained by identifying more favorable magnetic coating compositions, in particular, by identifying and utilizing binder components that are more favorable to the aforementioned critical properties in the coating compositions.

SUMMARY OF THE INVENTION

According to the invention, a magnetic recording medium comprises a nonmagnetic support and a magnetic layer adhered to the nonmagnetic support, wherein the magnetic layer comprises a ferromagnetic material and a binder system for attaching the ferromagnetic material to the nonmagnetic support, the binder system primarily comprising a polyester polyurethane polymer and small percentage amounts of a low molecular weight polyol crosslinked with a multifunctional isocyanate.

The present invention affords magnetic media coating compositions having improved performance in the critical areas of durability, layer-to-layer adhesion, and wound pile stability. Such improvements in key performance criteria are observed while employing additive components in amounts of just 1% of the binder composition and just 0.5% of the magnetic composition. Thus, the cost of materials is significantly reduced. Additionally, it is found that when such small amounts of said materials are added as a final step in the preparation of the coating mixture, there is no degradation of the quality of dispersion.

In a preferred embodiment, performance characteristics are significantly improved when 1,5-pentanediol is provided in the coating mixture in less than about 0.5 wt % of the total weight of the magnetic coating composition.

A further understanding of the nature and advantages of the invention may be realized by reference to the remaining portions of the specification.

DESCRIPTION OF PREFERRED EMBODIMENTS

The invention comprises a magnetic material, a nonmagnetic support and a binder system for binding the magnetic material to the support in such a way as to have desired magnetic and physical properties. The magnetic materials and the support materials are conventional in the art. The present invention represents an improvement in the binder system which is substantially nonreactive with both the magnetic material and the support material except for chemical adhesion between the support material and a coating of the binder system entraining the magnetic material.

Suitable binders for the present invention include conventional thermosetting, thermoplastic, and reactive resins and mixtures thereof. The amount of binder employed is about 5-50 parts by weight of the total coating solids. Preferably, the binder comprises about 30 parts by weight of the total solids weight of the coating mixture. Suitable binder systems include a polymeric resin or prepolymer, for example, vinyl chloride-vinyl acetate copolymers, cellulose resins, polyamide resins, polyacrylamide resins, butadiene type resins, urethane elastomers, polyester resins, polyester polyurethane resins, polyether polyurethane and isocyanate curable resins, and mixtures thereof. Preferably, the resins will be of the polyester polyurethane varieties.

The resin component used in the present invention may be a polyester polyurethane resin. The polyester portion of these resins is prepared by well-known means and are commercially available. Polyester resins are the polycondensation products of di- or polycarboxylic acids, and di- or polyhydroxy alcohols or alkylene oxides. Saturated polyesters are relatively free of unsaturation sites and are known as thermoplastics finding many uses in films. Unsaturated polyesters are curable or thermosetting and are known for their use in coatings and molding operations. Unsaturated polyesters are usually crosslinked through their double bonds with a compatible monomer also containing ethylenic unsaturation. Crosslinked resins are thermosetting and when fully cured are insoluble and infusible.

Simple urethanes are prepared by the reaction of alcohols with isocyanates. This reaction is known to be catalyzed by tertiary amines and salts of heavy metals. Polyurethanes may be obtained by the stepwise reaction of dihydric alcohols and diisocyanates. Customarily, catalysts, such as amines and heavy metal salts, are added to promote polymerization. Solutions of polyurethanes may also be used as coatings. Coatings with superior resistance to abrasion are produced by moisture curing of prepolymers with residual isocyanate groups. The water reacts with residual isocyanate groups to give unstable carbamic acid groups which decompose to terminal amino groups. The terminal amino groups react with residual isocyanate groups to yield polyureas.

Polyester polyurethanes are the condensation products of polyester monomers or prepolymers containing multiple hydroxy groups with diisocyanate monomers or prepolymers. Stepwise reaction of the hydroxy-containing polyester or polyester precursor with the diisocyanate molecules gives polyester polyurethane resins suitable for use in the present invention. Diisocyanates that can be used herein to prepare polyurethane or polyester polyurethane resins are, for example, 2,4-tolylenediisocyanate, 2,6-tolylenediisocyanate, p-phenylenediisocyanate, hexamethylenediisocyanate, tetramethylenediisocyanate, 2,4-naphthalenediisocyanate, 4,4'-diisocyanate-diphenylether,p-xylylenediisocyanate, 4-4'-diphenylmethane diisocyanate and the like. The polyester polyurethanes herein described are prepared from the reaction of 4-4'-diphenylmethane diisocyanate.

The above isocyanates, their dimers or trimers, and adducts of these isocyanates with diols or triols can function as cross-linking agents or chain extension reactants. A preferred multifunctional isocyanate is the product of three (3) moles of toluene diisocyanate with one mole of 1,1,1-trimethylolpropane, which is sold under the trade name CB-60 by Mobay Corporation. The amount of cross-linking agent can vary from 0.5 to 15%, depending on the media composition.

Examples of polyol components suitable for reacting with multifunctional isocyanates to provide a crosslinking agent are ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, and 1,4-cyclohexanedimethanol. Polyol components that impart unique and surprising properties to the compositions, and which represent a novel approach to magnetic media compositions, are low molecular weight alkylene glycols or polyols. Preferably, the alkylene glycols or polyols have molecular weights less than about 225. Suitable polyols are represented by the formula:

$$HO(CH_2)_nOH.$$

where n ranges from 2 to 12. Representative materials are ethylene glycol, propylene glycol, 1,4-butanediol, 1,5-pentanediol, 1,6-hexanediol, and the like. The most preferred diol component is 1,5-pentanediol. Preferably, the glycol or polyol is present in the magnetic coating mixture in an amount less than about 1 weight percent and greater than about 0.1 weight percent. The glycol or polyol selected need not have a straight chain backbone, i.e., branched structures are acceptable.

Also, hydroxy-containing ether products obtained from reacting oxiranes with diols are contemplated in the invention. For example, ethylene oxide adducts of bisphenol A, ethylene oxide adducts of polypropylene glycol, and the like, may be used. Additionally, tri- and tetraols, such as glycerol, may be used. Diols having heteroatoms, such as oxygen, sulfur, nitrogen, phosphorus, etc., in a methylene chain can be used without departing from the essence of the present invention.

Polyester polyurethanes suitable as matrices in the present invention include the thermoplastic urethane resins, having a softening point of less than 150° C., a molecular weight (MW) greater than 50,000 and less than about 200,000 daltons, and a glass transition temperature in the range of −30° to 40° C. Preferred polyester polyurethane materials include the Estane products of B.F. Goodrich Co., and the Morthane products of Morton Chemical corporation. Most preferred materials are Estane 5701 F1, Morton CA-280, Morthane CA-310, and the like.

The polyester polyurethanes may be used alone or in combination with high molecular weight polyol-type materials. Preferred combination materials are phenoxy resins, such as PKHJ, and vinyl choride copolymers, such as VAGH, etc., produced by Union Carbide Corporation.

Catalyst materials preferably are used in conjunction with the above multifunctional isocyanates. Typical catalytic agents are metal acetylacetonates of a variety of metals, e.g., Fe and Sn. A most preferred catalyst material is iron (III) acetylacetonate. The amount of catalyst used can vary from 0.1 to 0.5%, depending on the media composition.

Lubricant materials, which reduce the abrasion coefficient of the recording layer, also may be employed as a component of the compositions of the present invention. Especially suitable lubricants include fatty acid esters. The fatty acid esters may be used alone or in combination with other fatty acid esters, fatty acids, silicones, and the like. Also, oils, inorganic particles, and fine synthetic resin particles, such as olive oil, silicone oils, graphite, molybdenum disulfide, polyethylene and polyfluorocarbons, may be used as lubricants. A preferred lubricant system is the fatty acid ester/fluorosilicone combination taught in U.S. Pat. Nos. 4,822,637, 4,659,627, and 4,686,146.

In addition to the above components, hardeners, abrasives, antistatic agents, and dispersants may be included in the magnetic layer. Thus, inorganic particles, such as aluminum oxide, chromium oxide, iron oxide, carbon silicate, corundum, diamond, silicon carbide, silicon oxide, and mixtures thereof, can be added as hardeners or abrasives. The average particle size of the abrasive is preferably in the range of 0.01-5 μm. Carbon black or the like may be added as an antistatic agent. Soya lecithin may be added as a dispersant. Also, surfactants, plasticizers, antioxidants and mixtures thereof can be present in the recording layer, if desired.

The magnetic coating mixture is generally formed by dissolving or suspending all of the components of the magnetic layer in an organic solvent. Usually, the dispersion so created is then applied directly to a nonmagnetic support. Alternatively, the dispersion may be applied to an intermediate subbing or adhesive layer between the magnetic layer and the nonmagnetic support.

Generally, nonacidic organic solvents are preferred for use in the invention. Suitable organic solvents for use herein may be ketones, such as acetone, cyclohexanone, or methyl ethyl ketone; esters, such as methyl acetate, ethyl acetate, ethyl lactate and glycol acetate; glycol ethers, such as ethylene glycol dimethyl ether and ethylene glycol diethyl ether; monoethers, such as tetrahydrofuran and pyran; diethers, such as dioxane; polyethers, such as glyme and diglyme; aromatic hydrocarbons, such as benzene, toluene, or xylene; aliphatic hydrocarbons, such as hexane or heptane; and the like. A most preferred solvent is cyclohexanone.

Once a magnetic coating mixture is prepared, it is milled and dispersed for a predetermined time. The mixture is dispersed by high-speed shearing using standard dispersion equipment and procedures well-known within the art. The mixture is milled or dispersed in enough solvent to give a final coating composition preferably having 30-40% nonvolatiles.

The nonmagnetic support to which the magnetic coating is applied is composed of a variety of polymeric or metallic materials. For example, suitable polymeric materials may be polyesters, polyolefins, polyurethanes, polycarbonates, polyimides, polyamides, polyhydrazides, cellulose derivatives, or combinations of the above. Thus, such polymeric materials as polyethylene terephthalate, polypropylene, cellulose triacetate, polyvinyl chloride, and polyvinyl acetate may be employed. Suitable metallic substrates would be aluminum or copper and the like. Also, paper can be employed. A preferred support is polyethylene terephthalate film.

The magnetic coating is applied to one surface of the selected nonmagnetic support. A coating having a thickness of approximately 14 μm is applied to the support, so that the coating layer will have a dried thickness of 0.5-10 μm, preferably 1.5-7.0 μm. The layer is then oriented in a direct current magnetic field of 0 to 3000 gauss in a manner appropriate to the particular product application, i.e, digital, audio, flexible disk, etc.

The layer is dried at a desired temperature for a predetermined time appropriate to end use applications to give a residual solvent level of 0.3% or less. The recording medium is then smoothed using a calendar roll. For example, smoothing of the magnetic recording layer can be effected by passing the nonmagnetic support having an attached magnetic layer between a metal roll and a resilient roll and hot pressing it at a temperature of about 40°-110° C. It is recognized that minor or superfluous variations in process conditions can be employed without departing from the scope of the present invention.

To evaluate the end product for its performance under various judging criteria, the support and adhered coating are slit to a desired width, and its durability, wound-pile stability and layer-to-layer adherence are measured. Protocols for determining these properties for the prepared recording media are well-known to those skilled in the art and are identified below.

The following examples of preferred embodiments of the present invention are presented by way of illustration only and do not suggest that the above described methods and compositions are in any way limited by the specific examples set forth below.

EXAMPLES

The following examples are representative of magnetic recording compositions suitable for making digital tape. It is understood that compositions suitable for audio, video, and flexible disk applications are also within the scope of the present invention. Key performance results for coatings prepared using the following formulations are presented in Table 1. All formulations contain the following components: an antistatic agent, carbon black (sold by Cabot Corporation under the trade name Vulcan XC-72R); a dispersing agent, soya lecithin (liquid) (sold by Central Soya Company, Inc.); an abrasive material having a Mohs hardness greater than six, alumina (sold by Norton Chemical Corporation under the trade name E-330); a lubricant, butoxyethyl stearate and fluorosilicone, (sold by Dow Corning under the trade name FS 1265); and a polymerization catalyst, iron acetylacetonate (sold by Shepard Chemical Corporation). It is understood, however, that substitution of any of the above components with a comparable material, or removal of one or more of the components from the coating composition is within the scope of the present invention.

In all examples, further processing was carried out by applying a conductive carbon coating to the side of the film opposite the magnetic coating. The carbon coating was applied in a conventional manner well-known to those skilled in the art. However, such a conductive coating is not necessary for practice of the present invention and the absence of such a coating is contemplated as within the scope of the present invention.

A. BINDER COMPOSITIONS

Example 1

A magnetic coating mixture having the following constituents is prepared as described above. The polyester polyurethane employed (Estane 5701-F1) has a relatively low glass transition temperature ($T_g = -20°$ C).

| COMPONENT COATING/SOLIDS | % |
|---|---|
| Magnetic Oxide(a), γ-Fe₂O₃ | 69.01 |
| Soya Lecithin | 2.43 |
| Carbon (Vulcan XC-72R) | 6.25 |
| Alumina | 1.50 |
| Estane 5701-F1 | 18.26 |
| Butoxyethyl Stearate | 0.48 |
| Fluorosilicone(b) | 0.08 |
| 1,5-Pentanediol | 0.21 |
| Multifunctional Isocyanate(c) | 1.56 |
| Iron (III) Acetylacetonate | 0.23 |

(a)Magnetic Oxide, Surface Area = 26 m²/g
(b)Fluorosilicone = FS 1265, (Dow Corning)
(c)Multifunctional Isocyanate = CB-60 (Mobay Corp.)

The above coating mixture was dispersed and a coating was applied to polyethylene terephthalate film. The resulting magnetic medium was oriented, dried, and calendered following procedures described above. The above composition exhibited excellent performance characteristics with particularly outstanding improvements observed in the areas of pack stability, layer-to-layer adhesion, and durability. Performance comparisons are listed in Table 1.

Example 2

Following the procedure of Example 1, a magnetic recording composition was prepared using a polyester polyurethane having a glass transition temperature of ca 30° C. (Morthane CA-310), in place of Estane 5701-F1. 1,5-Pentanediol was again used as the crosslinking diol. A description of footnotes (a), (b) and (c) is given in Example 1.

| COMPONENT COATING/SOLIDS | % |
|---|---|
| Magnetic Oxide(a), γ-Fe₂O₃ | 69.00 |
| Soya Lecithin | 2.32 |
| Carbon (Vulcan XC-72R) | 6.13 |
| Alumina | 0.44 |
| Morthane CA-310 | 19.20 |
| Butoxyethyl Stearate | 1.61 |
| Fluorosilicone(b) | 0.28 |
| 1,5-Pentanediol | 0.10 |
| Multifunctional Isocyanate(c) | 0.81 |
| Iron (III) Acetylacetonate | 0.12 |

After dispersing, coating on polyethylene terephthalate film, orienting, drying, and calendering, the composition exhibited improved performance characteristics. Some of the key improvements in performance are presented in Table 1.

Example 3

Following the procedure given in Example 1, a magnetic coating composition having the following formulation was prepared. Performance results of the coating are given in Table 1. A description of footnotes (a), (b) and (c) is given in Example 1.

| COMPONENT COATING/SOLIDS | % |
|---|---|
| Magnetic Oxide(a), γ-Fe₂O₃ | 68.09 |
| Soya Lecithin | 2.32 |
| Carbon (Vulcan XC-72R) | 6.04 |
| Alumina | 0.75 |
| Estane 5701-F1 | 20.39 |
| Butoxyethyl Stearate | 0.48 |
| Fluorosilicone(b) | 0.08 |
| 1,5-Pentanediol | 0.2 |
| Multifunctional Isocyanate(c) | 1.56 |
| Iron (III) Acetylacetonate | 0.11 |

Example 4

Following the procedure given in Example 1, a magnetic coating composition having the following formulation was prepared. Performance results for the coating are given in Table 1. A description of footnotes (a), (b) and (c) is given in Example 1.

| COMPONENT COATING/SOLIDS | % |
|---|---|
| Magnetic Oxide(a), γ-Fe₂O₃ | 68.95 |
| Soya Lecithin | 2.32 |
| Carbon (Vulcan XC-72R) | 6.12 |
| Alumina | 0.44 |
| Estane 5701-F1 | 20.65 |
| Butoxyethyl Stearate | 0.49 |
| Fluorosilicone(b) | 0.08 |
| 1,5-Pentanediol | 0.07 |
| Multifunctional Isocyanate(c) | 0.52 |
| Iron (III) Acetylacetonate | 0.04 |

Example 5

Following the procedure presented in Example 2, a magnetic coating composition having the following formulation was prepared. Key performance results for the coating are given in Table 1. A description of footnotes (a), (b) and (c) is given in Example 1.

| COMPONENT COATING/SOLIDS | % |
|---|---|
| Magnetic Oxide(a), γ-Fe₂O₃ | 68.50 |
| Soya Lecithin | 2.30 |
| Carbon (Vulcan XC-72R) | 6.08 |
| Alumina | 0.44 |
| Morthane CA-310 | 18.49 |
| Butoxyethyl Stearate | 1.60 |
| Fluorosilicone(b) | 0.28 |
| 1,5-Pentanediol | 0.10 |
| Multifunctional Isocyanate(c) | 1.08 |
| Iron (III) Acetylacetonate | 0.16 |

Example 6

Following the procedure presented in Example 2, a magnetic coating composition having the following formulation was prepared. Key performance results for the coating are given in Table 1. A description of footnotes (a), (b) and (c) is given in Example 1.

| COMPONENT COATING/SOLIDS | % |
|---|---|
| Magnetic Oxide(a), γ-Fe₂O₃ | 68.72 |
| Soya Lecithin | 2.32 |
| Carbon (Vulcan XC-72R) | 6.10 |
| Alumina | 0.44 |
| Morthane CA-310 | 19.11 |
| Butoxyethyl Stearate | 1.60 |
| Fluorosilicone(b) | 0.28 |
| 1,5-Pentanediol | 0.20 |
| Multifunctional Isocyanate(c) | 1.08 |

| COMPONENT COATING/SOLIDS | % |
|---|---|
| Iron (III) Acetylacetonate | 0.16 |

Example 7

Following the procedure presented in Example 1, a magnetic coating composition having the following formulation was prepared. Performance evaluation results of the coating are given in Table 1. A description of footnotes (a), (b) and (c) is given in Example 1.

| COMPONENT COATING/SOLIDS | % |
|---|---|
| Magnetic Oxide[a], γ-Fe₂O₃ | 68.01 |
| Soya Lecithin | 2.28 |
| Carbon (Vulcan XC-72R) | 6.03 |
| Alumina | 0.75 |
| Estane 5701-F1 | 20.37 |
| Butoxyethyl Stearate | 0.48 |
| Fluorosilicone[b] | 0.08 |
| 1,5-Pentanediol | 0.20 |
| Multifunctional Isocyanate[c] | 1.56 |
| Iron (III) Acetylacetonate | 0.23 |

Example 8

A magnetic coating composition having the following formulation was prepared following the procedure given for Example 1, except that 1,5-pentanediol was omitted from the formula. A description of footnotes (a), (b) and (c) is given in Example 1.

| COMPONENT COATING/SOLIDS | % |
|---|---|
| Magnetic Oxide[a], γ-Fe₂O₃ | 69.14 |
| Soya Lecithin | 2.43 |
| Carbon (Vulcan XC-72R) | 6.26 |
| Alumina | 1.50 |
| Estane 5701-F1 | 18.29 |
| Butoxyethyl Stearate | 0.48 |
| Fluorosilicone[b] | 0.08 |
| 1,5-Pentanediol | — |
| Multifunctional Isocyanate[c] | 1.56 |
| Iron (III) Acetylacetonate | 0.23 |

Key performance evaluation results for the coating are given in Table 1. The results indicate that the presence of diol is important in attaining the desired performance characteristics. A description of footnotes (a), (b) and (c) is given in Example 1.

Example 9

A magnetic coating composition having the formulation of Example 2 was prepared, except that 1,5-pentanediol was omitted from the formulation. Performance evaluation results of the coating are given in Table 1. The results indicate that diol is important in obtaining the desired performance results. A description of footnotes (a), (b) and (c) is given in Example 1.

| COMPONENT COATING/SOLIDS | % |
|---|---|
| Magnetic Oxide[a], γ-Fe₂O₃ | 69.00 |
| Soya Lecithin | 2.32 |
| Carbon (Vulcan XC-72R) | 6.13 |
| Alumina | 0.44 |
| Morthane CA-310 | 16.61 |
| Butoxyethyl Stearate | 1.61 |
| Fluorosilicone[b] | 0.28 |
| 1,5-Pentanediol | — |
| Multifunctional Isocyanate[c] | 0.54 |
| Iron (III) Acetylacetonate | 0.08 |

Example 10

A magnetic coating composition was prepared following the procedure of Example 1, except that 1,5-pentanediol was omitted from the formulation. Performance evaluation results for the coating are given in Table 1. The results indicate that diol is critical to obtaining the desired performance characteristics. A description of footnotes (a), (b) and (c) is given in Example 1.

| COMPONENT COATING/SOLIDS | % |
|---|---|
| Magnetic Oxide[a], γ-Fe₂O₃ | 69.00 |
| Soya Lecithin | 2.32 |
| Carbon (Vulcan XC-72R) | 6.12 |
| Alumina | 0.76 |
| Estane 5701-F1 | 20.66 |
| Butoxyethyl Stearate | 0.49 |
| Fluorosilicone[b] | 0.08 |
| 1,5-Pentanediol | — |
| Multifunctional Isocyanate[c] | 0.53 |
| Iron (III) Acetylacetonate | 0.04 |

B. DESCRIPTION OF PERFORMANCE TESTS AND RESULTS

Following are brief descriptions and citations for the specific tests used to identify improvements in magnetic tape utilizing the above magnetic coating mixtures. Improvements in wound pile stability, layer-to-layer adhesion, and durability were noted. Results are presented in Table 1.

TABLE 1

PERFORMANCE TEST/EVALUATION OF COMPOSITIONS

| | EXAMPLE | | | | | | | | | |
|---|---|---|---|---|---|---|---|---|---|---|
| | 1 | 2 | 3 | 4 | 5 | 6 | 7 | 8 | 9 | 10 |
| Wound Pile Stability[a] | 100% | * | * | * | * | * | * | 100% | 50% | 50% |
| Layer-to-Layer Adhesion[b] | 1 | 1.9 | 2.9 | 2.4 | 1.9 | 1.9 | 6.7 | 2.3 | 5.9 | 4.7 |
| Durability | Pass | * | * | * | * | * | * | Fail | * | * |

[a]Value shown is percentage passing
[b]Value shown is relative rating compared to standard of Example 1.
*No data

1. Wound Pile Stability

Wound pile stability was determined following appropriate Federal tape specifications, such as NSA L-14-3, DOD W-T-1553A, and NASA TM-79724. The tapes were rated as pass or fail per criteria established in the appropriate Federal tape specification.

2. Layer-to-Layer Adhesion

Layer-to-layer adhesion properties were determined according to the appropriate Federal tape specifications, such as NSA L-14-3, DOD W-T-1553A, and NASA TM-79724. A rating system was developed in which layer-to-layer attributes were correlated. Numerical ratings two times greater than standard tape were regarded as failing the test. All compositions containing 1,5-pentanediol registered improved performance, with respect to comparable formulations lacking diol. Closest comparisons are between Example 8 and Example 1, Example 9 and Example 2, and Example 10 and Example 4.

3. Durability

Durability testing essentially consists of monitoring dropout performance and signal uniformity over a given section of tape (500 m). All tracks were monitored for 100 passes on a durability test transport. In addition, clog, defined as instantaneous signal losses greater than 25%, is monitored. Passing durability criteria are no clog, signal uniformity within $\pm 16\%$ of maximum peak output, and dropouts per 100 feet not exceeding ten per center track and fifteen per edge track. Formulations containing 1,5-pentanediol exhibited a passing durability, whereas those lacking diol failed.

The invention has now been explained with reference to specific embodiments. It is to be understood that the above description is intended to be illustrative and not restrictive. Many embodiments will be apparent to those of skill in the art upon reviewing the above description. For example, ferromagnetic oxides used as the magnetic material may be substituted with ferrimagnetic oxides or ferromagnetic metals and alloys. Also, small amounts of nonmetallic or nonmagnetic elements can be incorporated along with the ferromagnetic material as long as the desired physical and magnetic properties are not impaired. The scope of the invention should, therefore, be determined not with reference to the above description, but should instead be determined with reference to the appended claims, along with the full scope of equivalents to which such claims are entitled.

What is claimed is:

1. A magnetic recording composition capable of coating a nonmagnetic support, said composition comprising a ferromagnetic substance and a binder system for adhering the ferromagnetic substance to the nonmagnetic support, wherein said binder system comprises a polyester polyurethane polymer and a polyol having a molecular weight of less than about 400, said polyol crosslinked with a multifunctional isocyanate, and wherein the polyol is present in the binder system in less than about 1 wt % and more than about 0.07 wt % of the total weight of the magnetic coating mixture.

2. A composition according to claim 1, wherein the polyester polyurethane polymer has a molecular weight greater than about 50,000 and less than about 200,000 daltons.

3. A composition according to claim 1, wherein the polyester polyurethane polymer has a glass transition temperature greater than about $-30°$ C. and less then about 40° C.

4. A composition according to claim 1, wherein the polyol is represented by the formula:

$$HO(CH_2)_nOH.$$

where n ranges from 2 to 12.

5. A composition according to claim 1, wherein the polyol has a molecular weight less than 255 daltons and is selected from the group of diols consisting of ethylene glycol, propylene glycol, 1,4-butanediol, 1,5-pentanediol and 1,6-hexanediol.

6. A magnetic recording medium comprising a nonmagnetic support and a layer of magnetic composition adhered to the nonmagnetic support, wherein the magnetic composition comprises a ferromagnetic substance and a binder system for attaching the ferromagnetic substance to the nonmagnetic support, wherein the binder system comprises a polyester polyurethane polymer and a polyol having a molecular weight of less than about 400, said polyol crosslinked with a multifunctional isocyanate, and wherein the polyol is present in the binder system in less than about 1 wt % and more than about 0.07 wt % of the total weight of the magnetic coating mixture.

7. A magnetic recording medium as in claim 6, wherein the nonmagnetic support is polyterephthalate film.

8. A composition according to claim 6, wherein the polyester polyurethane polymer has a molecular weight greater than about 50,000 and less than about 200,000 daltons.

9. A composition according to claim 6, wherein the polyester polyurethane polymer has a glass transition temperature greater than about $-30°$ C. and less than about 40° C.

* * * * *